US012718987B2

(12) United States Patent
Huang et al.

(10) Patent No.: US 12,718,987 B2
(45) Date of Patent: Aug. 25, 2026

(54) MINIATURIZED CAPACITOR HAVING BUILT-IN CONDUCTIVE LEADS

(71) Applicant: TRUSTCAP TECHNOLOGY CO., LTD., Miaoli County (TW)

(72) Inventors: Wen-Yen Huang, Miaoli County (TW); Li-Kun Lu, Miaoli County (TW)

(73) Assignee: TRUSTCAP TECHNOLOGY CO., LTD., Zhunan Township (TW)

( * ) Notice: Subject to any disclaimer, the term of this patent is extended or adjusted under 35 U.S.C. 154(b) by 121 days.

(21) Appl. No.: 18/375,561

(22) Filed: Oct. 2, 2023

(65) Prior Publication Data

US 2025/0046522 A1 Feb. 6, 2025

(30) Foreign Application Priority Data

Aug. 1, 2023 (TW) ................................ 112128850

(51) Int. Cl.

*H01G 4/236* (2006.01)
*H01G 2/10* (2006.01)
*H01G 4/228* (2006.01)

(52) U.S. Cl.

CPC ............. *H01G 4/236* (2013.01); *H01G 2/103* (2013.01); *H01G 4/228* (2013.01)

(58) Field of Classification Search

CPC ........ H01G 4/224; H01G 2/103; H01G 4/228; H01G 4/236

See application file for complete search history.

(56) References Cited

U.S. PATENT DOCUMENTS

| | | | | |
|---|---|---|---|---|
| 4,447,852 A * | 5/1984 | Clement | .................. | H01G 9/00 361/306.1 |
| 4,499,524 A * | 2/1985 | Shioleno | ................ | H05K 1/141 361/772 |
| 4,547,829 A * | 10/1985 | Efford | .................... | H01G 9/008 361/531 |
| 4,803,598 A * | 2/1989 | Efford | ...................... | H01G 9/08 361/541 |

(Continued)

FOREIGN PATENT DOCUMENTS

| | | |
|---|---|---|
| CN | 113707453 A | 11/2021 |
| CN | 114071866 A | 2/2022 |

(Continued)

OTHER PUBLICATIONS

Office Action issued on Jan. 27, 2026, in corresponding Japanese Application No. 2024-125000, 8 pages.

(Continued)

*Primary Examiner* — David M Sinclair

(74) *Attorney, Agent, or Firm* — Maier & Maier, PLLC

(57) ABSTRACT

A miniaturized capacitor having built-in conductive leads includes a substrate, a main capacitor body, a plurality of conductive members and a plurality of conductive leads. The main capacitor body, disposed on the substrate, includes a capacitor unit and a packaging structure wrapping the capacitor unit. Each of the plurality of conductive members penetrates through the substrate, each of the plurality of conductive leads penetrates through the packaging structure, and the capacitor unit is connected with the plurality of conductive members via the plurality of conductive leads.

9 Claims, 5 Drawing Sheets

(56) References Cited

U.S. PATENT DOCUMENTS

| | | | | |
|---|---|---|---|---|
| 4,882,115 | A * | 11/1989 | Schmickl | H01G 9/08 29/25.03 |
| 6,870,728 | B1 * | 3/2005 | Burket | H01G 9/15 361/538 |
| 2009/0116173 | A1 | 5/2009 | Shimizu et al. | |
| 2015/0287670 | A1 * | 10/2015 | Fukase | H01L 23/49589 361/813 |
| 2024/0170225 | A1 * | 5/2024 | Chung | H01G 9/26 |

FOREIGN PATENT DOCUMENTS

| | | | | | |
|---|---|---|---|---|---|
| CN | 114093669 | A | | 2/2022 | |
| CN | 113707453 | B | * | 3/2023 | |
| CN | 116230404 | A | * | 6/2023 | H01G 4/232 |
| EP | 4185078 | A | | 5/2023 | |
| JP | S60262415 | A | | 12/1985 | |
| JP | 2002025858 | A | | 1/2002 | |
| JP | 2002043170 | A | | 2/2002 | |
| JP | 2002134362 | A | | 5/2002 | |
| JP | 2004104048 | A | | 4/2004 | |
| JP | 2008028074 | A | * | 2/2008 | H01G 9/012 |
| JP | 2009065140 | A | * | 3/2009 | |
| JP | 2009260207 | A | | 11/2009 | |
| JP | 2010021318 | A | | 1/2010 | |
| JP | 2010278032 | A | | 12/2010 | |
| JP | 2012033603 | A | | 2/2012 | |
| JP | 2021136324 | A | | 9/2021 | |
| TW | 463190 | B | | 11/2001 | |
| TW | M649359 | U | | 12/2023 | |

OTHER PUBLICATIONS

Office Action issued on Jul. 8, 2025, in corresponding Japanese Application No. 2024-125000, 12 pages.

Office Action issued on Dec. 21, 2023, in corresponding Taiwanese Application No. 112128850, 20 pages.

* cited by examiner

MINIATURIZED CAPACITOR HAVING BUILT-IN CONDUCTIVE LEADS

CROSS REFERENCE TO RELATED APPLICATION

This application claims the benefits of Taiwan application Serial No. 112128850, filed on Aug. 1, 2023, the disclosures of which are incorporated by references herein in its entirety.

TECHNICAL FIELD

The present disclosure relates in general to a capacitor, and more particularly to a miniaturized capacitor having built-in conductive leads.

BACKGROUND

A capacitor is a common passive component that is widely used in various circuits to provide versatile functions. Currently, a packaging structure of a typical capacitor mainly includes a type of metal shell and a type of molded epoxy compound.

Regard the metal-shell packaging structure. A capacitor with this type of packaging structure includes a cylindrical metal shell, a capacitor unit (i.e., the capacitor core), two guide pins and round rubber plugs. The capacitor unit and the guide pins are connected, and the guide pins are individually to pass through the corresponding round rubber plugs. With this type of packaging structure, the cylindrical metal shell can be combined with the rubber plugs so that the capacitor unit can be placed properly between the cylindrical metal shell and the rubber plugs. However, although the round rubber plug can provide a sealing effect, a thickness of the capacitor would be increased. In addition, the guide pins are exposed on the cylindrical metal shell, and a plastic plate is required to isolate electrically the guide pins from the cylindrical metal shell. The additional structures would also increase the thickness of the capacitor. Thus, this type of capacitor cannot meet the requirement of miniaturization. In addition, if the capacitor is prepared as a surface mount component, then the guide pin shall be inevitably crushed and bent to some degree, and the structure of the capacitor would be damaged to reduce the reliability thereof.

On the other hand, though the epoxy-molding packaging structure can reduce a height of the capacitor, yet the miniaturization requirements thereupon would be still not met because the guide pin is still exposed on the surface of the capacitor. Similarly, if the capacitor is prepared as a surface mount component, then the guide pin shall be also inevitably crushed and bent to some degree, and the structure of the capacitor would be damaged to reduce the reliability thereof as well.

SUMMARY

In this disclosure, a miniaturized capacitor having built-in conductive leads includes a substrate, a main capacitor body, a plurality of conductive members and a plurality of conductive leads. The main capacitor body, disposed on the substrate, includes a capacitor unit and a packaging structure wrapping the capacitor unit. Each of the plurality of conductive members penetrates through the substrate, each of the plurality of conductive leads penetrates through the packaging structure, and the capacitor unit is connected with the plurality of conductive members via the plurality of conductive leads.

In one embodiment of this disclosure, each of the plurality of conductive members includes a first conductive pad, at least one through hole and a second conductive pad, the first conductive pad is disposed on an upper surface of the substrate, the second conductive pad is disposed on a lower surface of the substrate, and the first conductive pad is connected with the second conductive pad via the at least one through hole.

In one embodiment of this disclosure, the plurality of conductive leads are wrapped by the capacitor unit, the packaging structure and the substrate.

In one embodiment of this disclosure, each of the plurality of conductive leads is L shaped.

In one embodiment of this disclosure, each of the plurality of conductive leads includes a bendable portion, a welding portion and a wiring portion, the bendable portion is connected with the wiring portion via the welding portion, and the wiring portion and the corresponding conductive member are electrically connected.

In one embodiment of this disclosure, the welding portion includes a connection area and a welding area connected with the connection area, and the wiring portion is welded onto the welding area.

In one embodiment of this disclosure, the bendable portion, the welding portion and the wiring portion are all flat shaped.

In one embodiment of this disclosure, a thickness of the welding portion or the wiring portion is greater than that of the bendable portion.

In one embodiment of this disclosure, the packaging structure is made of an insulation material.

In one embodiment of this disclosure, the substrate is one of a printed circuit board and a flexible circuit board.

As stated, in the capacitor of this disclosure, the substrate is effectively integrated with the plurality of built-in conductive leads, such that no more round rubber plug and plastic plate are required, and the height of the capacitor can be significantly reduced. Namely, the size of the capacitor can be greatly reduced to meet the needs of miniaturization.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
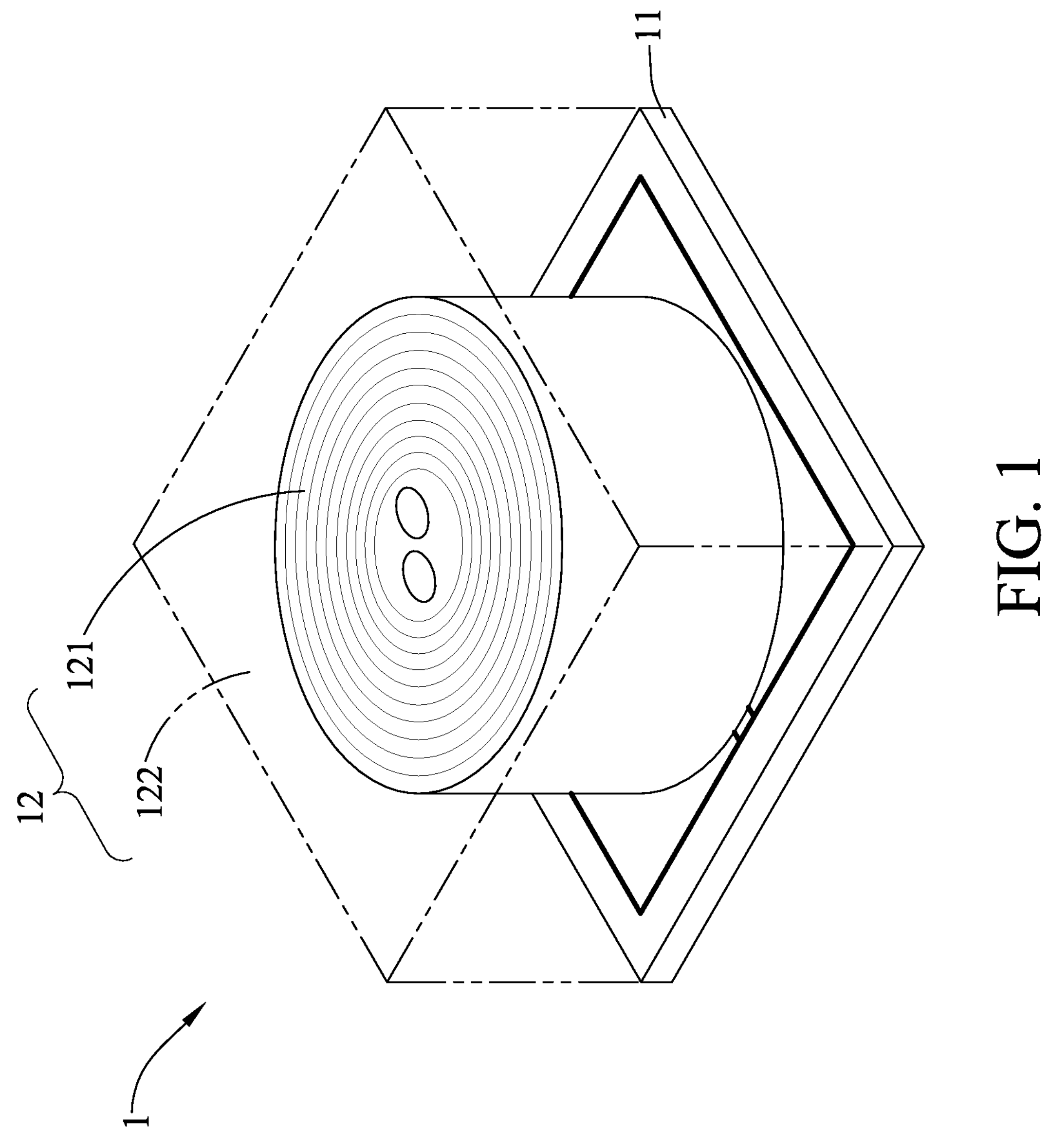
FIG. 1 is a schematic perspective view of an embodiment of the miniaturized capacitor having built-in conductive leads in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following will refer to the related drawings to illustrate embodiments of the miniaturized capacitor having built-in conductive leads according to the present invention. For the sake of clarity and convenience of illustration, the size and proportion of the components in the drawings may be exaggerated or represented in a reduced size. In the following description and/or claims, when an element is "connected" or "coupled" to another element, it may be directly connected or coupled to the other element or through intervening elements. When "directly connected" or "directly coupled" to another element, there are no intervening elements. Similarly, any other words used to describe the relationship between elements or layers should be interpreted in the same way. To facilitate understanding, the same components in the following embodiments are described with the same symbols.

Figure 2:
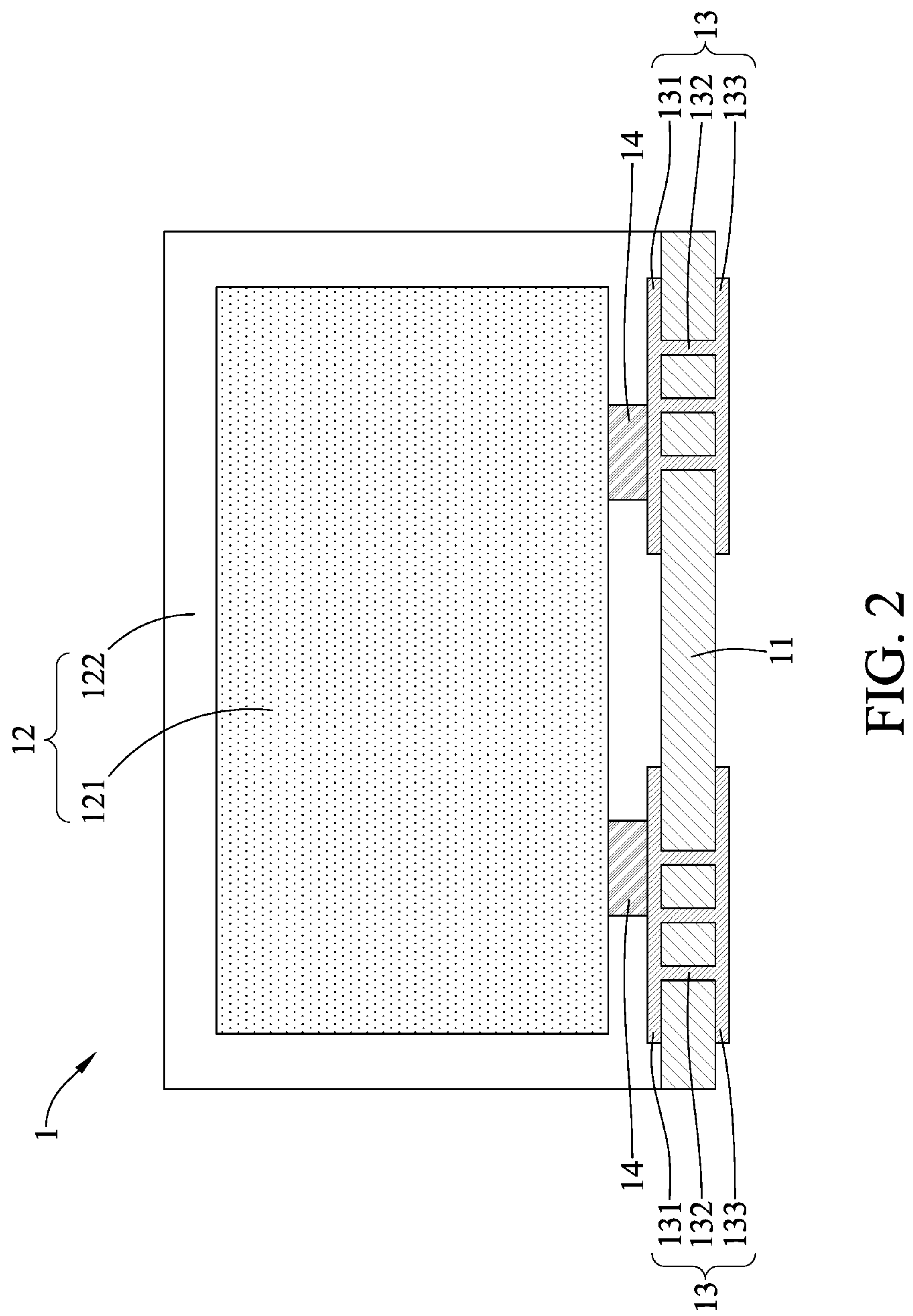
FIG. 2 shows schematically a first cross-sectional view of FIG. 1.

Referring to FIG. 1 and FIG. 2, a perspective view and a cross-sectional view of an embodiment of the miniaturized capacitor having built-in conductive leads in accordance with this disclosure are schematically shown, respectively. The capacitor 1 includes a substrate 11, a main capacitor body 12, a plurality of conductive members 13 (two shown in the figure) and a plurality of conductive leads 14 (two shown in the figure). The capacitor 1 is structured to be applicable to film capacitors, aluminum solid-state winding capacitors, aluminum solid-state stacked capacitors and tantalum capacitors.

The main capacitor body 12, disposed on the substrate 11, includes a capacitor unit 121 and a packaging structure 122 to wrap the capacitor unit 121. In one embodiment, the packaging structure 122 can be an insulation material, such as an insulating glue. In one embodiment, the substrate 11 can be a printed circuit board or the like. In another embodiment, the substrate 11 can be a flexible circuit board or the like.

Each of the plurality of conductive members 13, penetrating through the substrate 11, includes a first conductive pad 131, a plurality of through holes 132 (three shown in this embodiment, but not limited thereto) and a second conductive pad 133. The first conductive pad 131 is disposed on an upper surface of the substrate 11, while the second conductive pad 133 is disposed on a lower surface of the substrate 11. Through the plurality of through holes 132, the first conductive pad 131 can be connected with the second conductive pad 133. In another embodiment, the conductive members 13 can be structured according to practical requirements. In one embodiment, the conductive members 13 can be made of copper, tin, iron, aluminum or any other metal or non-metal conductive material.

Each of the plurality of conductive leads 14, penetrating through the packaging structure 122, can be L shaped. One of the conductive leads 14 can be disposed aside to another conductive lead 14; i.e., in a parallel arrangement. Thereupon, the capacitor unit 121 can be connected with the plurality of conductive members 13 via the plurality of conductive leads 14. In one embodiment, the conductive lead 14 can be made of copper, tin, iron or any other conductive material.

As described above, the plurality of conductive leads 14 are disposed in the packaging structure 122 between the capacitor unit 121 and the substrate 11. As such, the plurality of conductive leads 14 can be wrapped by the capacitor unit 121, the packaging structure 122 and the substrate 11 so as not to expose the plurality of conductive leads 14 out of the capacitor 1. Thereupon, in the capacitor 1, the substrate 11 can be effectively integrated with the plurality of conductive leads 14, such that the entire structure of the capacitor 1 can be simplified, and the height thereof can be significantly reduced. In other words, the size of the capacitor 1 can be greatly reduced to meet the needs of miniaturization.

In addition, the plurality of conductive leads 14 are built inside the capacitor 1, without any exposure to the surface of the capacitor 1. Also, in this disclosure, the capacitor 1 can have a plurality of conductive members 13 disposed at the substrate 11. With the aforesaid structures, the capacitor 1 can be electrically connected with the other components via the plurality of conductive members 13. Thus, as the capacitor 1 is prepared as an SMT component, the plurality of conductive leads 14 of the capacitor 1 won't be crushed or bent, and so the structuring of the capacitor 1 can be upheld. Namely, the capacitor 1 can present higher structural stability, and the reliability of the capacitor 1 can be effectively enhanced.

Of course, this embodiment is only for illustration and not limiting the scope of this disclosure, and equivalent modifications or changes made according to the miniaturized capacitor having built-in conductive leads of the aforesaid embodiment should be still included within the patent scope of this disclosure.

Figure 3:
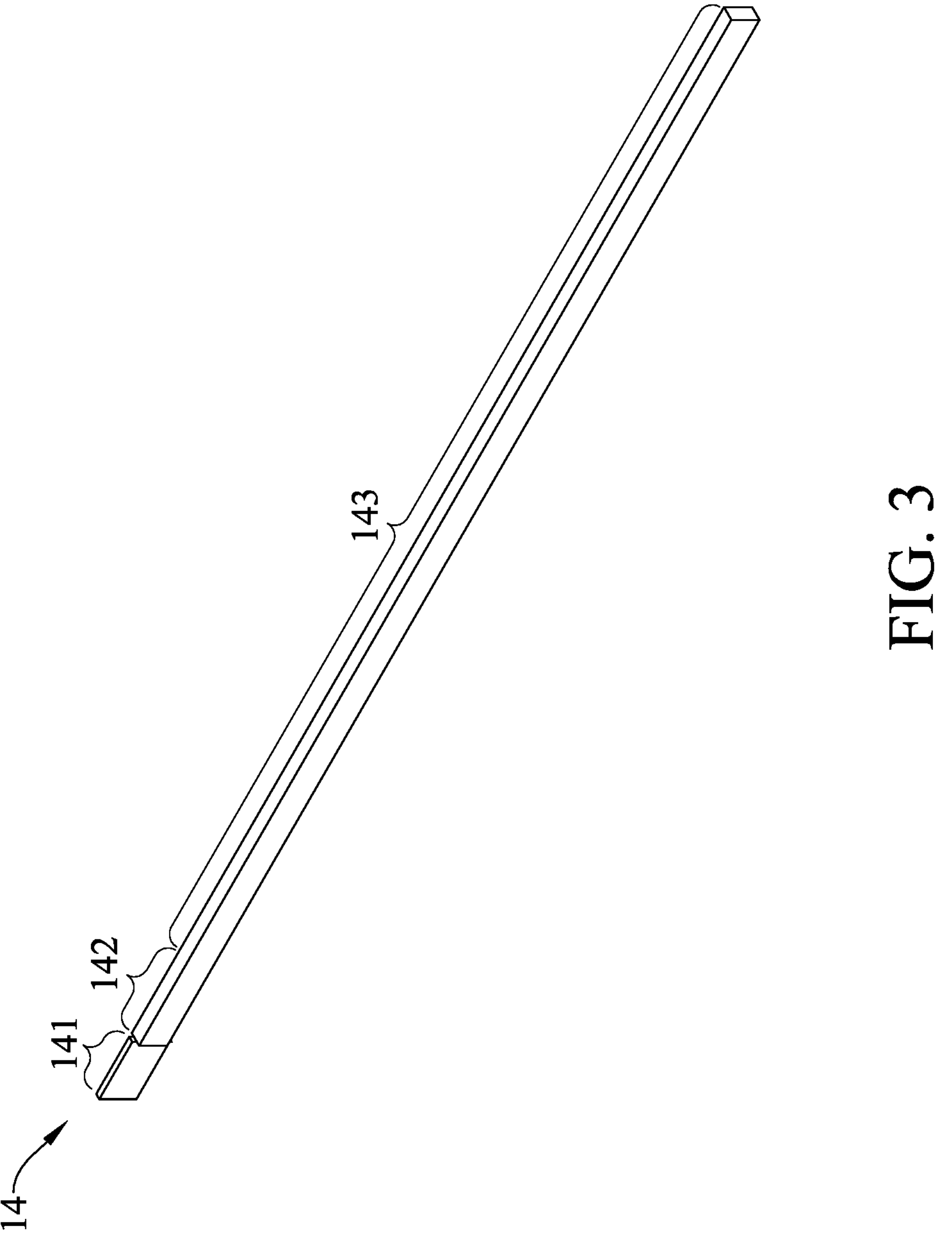
FIG. 3 is a schematic perspective view of the conductive lead of FIG. 2.
Figure 4:
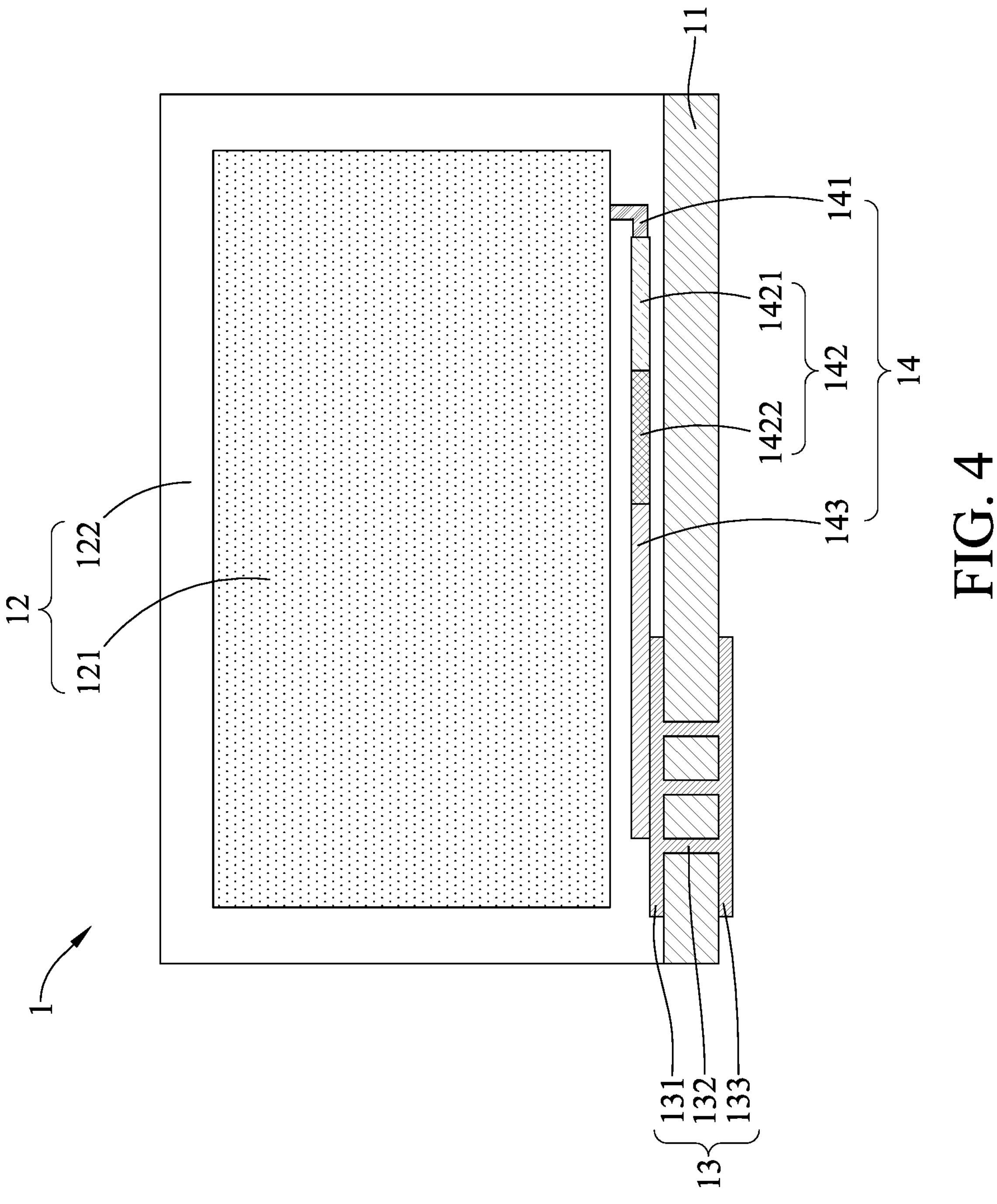
FIG. 4 shows schematically a second cross-sectional view of FIG. 1.

Referring now to FIG. 3 and FIG. 4, a perspective view of one of the conductive leads 14 and a second cross-sectional view of the capacitor 1 are schematically shown, respectively. In FIG. 3, the conductive lead 14 is still free from contact with the capacitor unit 121. As shown, the conductive lead 14 includes a bendable portion 141, a welding portion 142 and a wiring portion 143. The bendable portion 141, the welding portion 142 and the wiring portion 143 are all flat configured, and materials for the bendable portion 141, the welding portion 142 and the wiring portion 143 might be identical or different. The bendable portion 141 is connected the wiring portion 143 via the welding portion 142. The wiring portion 143 can be connected with the welding portion 142 through welding. In this embodiment, the thickness of the welding portion 142 or the wiring portion 143 is greater than that of the bendable portion 141. In another embodiment, the thickness of the welding portion 142 or the wiring portion 143 can be less than or equal to that of the bendable portion 141.

Of course, this embodiment is only for illustration and not limiting the scope of this disclosure, and equivalent modifications or changes made according to the miniaturized capacitor having built-in conductive leads of the aforesaid embodiment should be still included within the patent scope of this disclosure.

FIG. 4 illustrates schematically the structuring of the engaged conductive leads 14 and capacitor unit 121. As shown, the conductive lead 14 of the capacitor 1 is L shaped (one conductive lead 14 shown in the figure). As described, the conductive lead 14 includes a bendable portion 141, a welding portion 142 and a wiring portion 143. As shown in FIG. 4, the bendable portion 141 is bent by an angle. The welding portion 142 includes a connection area 1421 or/and a welding area 1422, and thus the wiring portion 143 can be welded or soldered onto the welding area 1422 of the welding portion 142.

The capacitor unit 121 is connected with the conductive member 13 via the corresponding conductive lead 14, by having the wiring portion 143 of the conductive lead 14 to adhere or bind electrically the corresponding conductive member 13. For example, the wiring portion 143 can be soldered onto the conductive members 13 so as to electrically bind the wiring portion 143 and the conductive member 13 together. For one more example, the wiring portion 143 can utilize the conductive glue to bind the conductive member 13 so as to connect electrically the wiring portion 143 and the conductive members 13. As described, the wiring portion 143 is flat shaped, such that the contact area with the conductive member 13 (i.e., at first conductive pad 131) can be increased to reach a better electrical binding.

As described, the conductive lead 14 is furnished with the bendable portion 141, so that the conductive lead 14 can be L shaped to form a spatial bridge structure for electrically connecting the capacitor unit 121 to the conductive member 13. Thereupon, the entire height of the capacitor 1 can be substantially reduced.

In addition, those with ordinary knowledge in the art should understand that the guide pin of the existing capacitor includes an A portion, a B portion and a CP wire. Among them, the B portion needs to be inserted into a hole corresponding to the round rubber plug, and so the B portion must be in the shape of a thick cylinder, such that an interference fit between the hole and the corresponding round rubber plug can be achieved. Definitely, the aforementioned structure makes the structural size of the existing capacitor impossible to reduce. In addition, the guide pin is exposed on the cylindrical metal shell, and so a plastic plate is required to isolate the plurality of guide pins from the cylindrical metal shell, such that the above structure will also increase the thickness of the capacitor. Furthermore, if the existing capacitor is prepared as an SMT component, depressing and bending upon the plurality of guide pins would be inevitable, and thus the structuring of the capacitor will be damaged to reduce the reliability of the capacitor.

On the other hand, the conductive lead 14 of this embodiment is flat shaped, and thus the entire volume of the capacitor 1 can be reduced. Also, the conductive lead 14 is furnished with the L-shape bendable portion 141 for providing a more space-effective bridge structure. Thereupon, the total height of the capacitor 1 can be reduced, and the size thereof can be lowered, such that the demand for miniaturization can be met, and extended use and better flexibility thereto can be achieved.

In addition, since the plurality of conductive leads 14 are not exposed to the surface of the capacitor 1, thus the capacitor 1 as an SMT component can be connected electrically to other components directly via the plurality of conductive members 13; i.e., no more depression and bending upon the conductive leads 14. Since possible structural damage upon the capacitor 1 can be avoided, thus the capacitor 1 of this disclosure can reach a higher structural stability to also increase effectively the reliability thereof.

Of course, this embodiment is only for illustration and not limiting the scope of this disclosure, and equivalent modifications or changes made according to the miniaturized capacitor having built-in conductive leads of the aforesaid embodiment should be still included within the patent scope of this disclosure.

Figure 5:
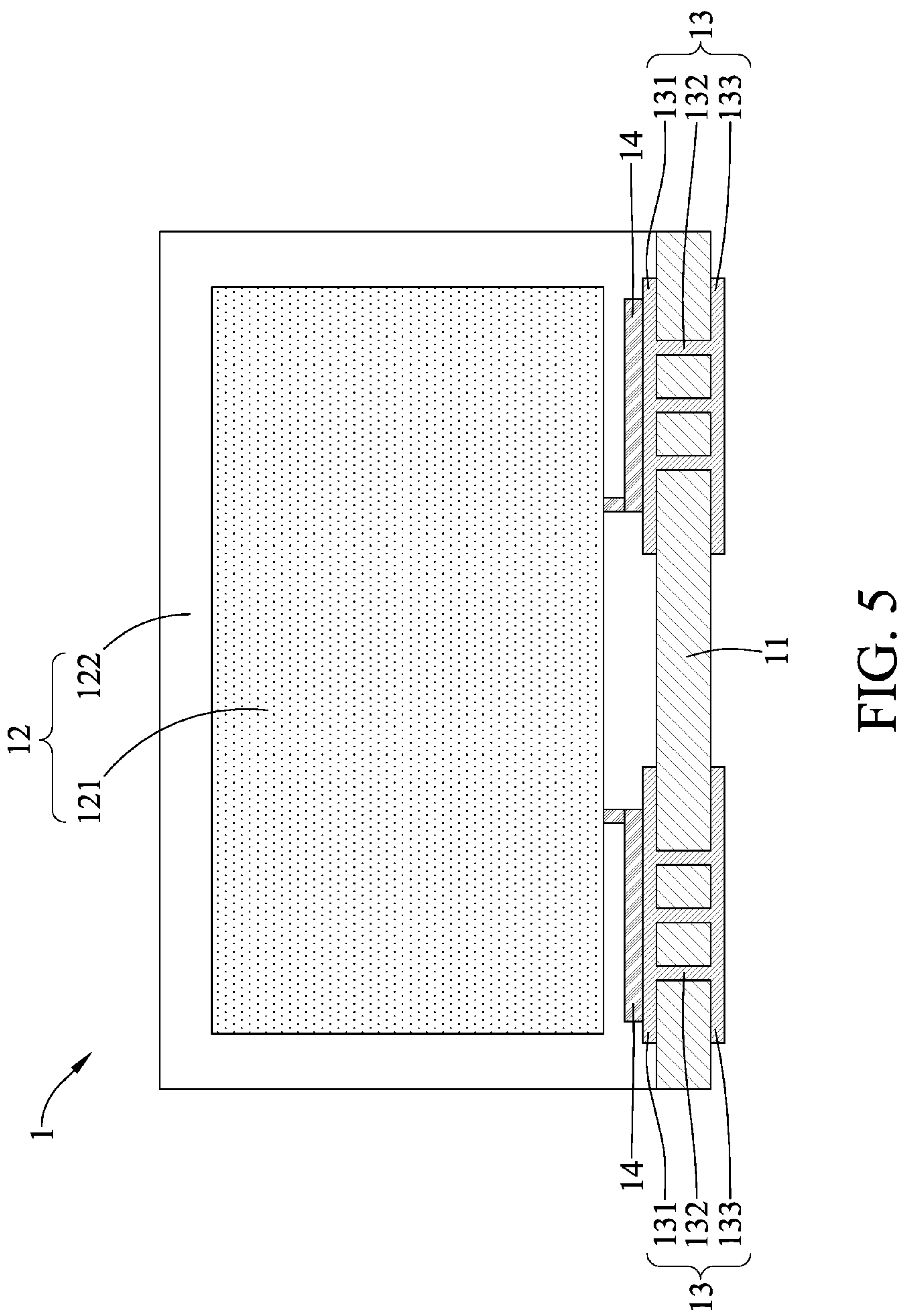
FIG. 5 is a schematic cross-sectional view of another embodiment of the miniaturized capacitor having built-in conductive leads in accordance with this disclosure.

Referring to FIG. 5, a schematic cross-sectional view of another embodiment of the miniaturized capacitor having built-in conductive leads in accordance with this disclosure is shown. In this embodiment, the capacitor 1 includes a substrate 11, a main capacitor body 12, two conductive members 13 and two conductive leads 14.

Since the aforesaid components are similar to those in the previous embodiment, so details thereabout would be omitted herein. The difference from the previous embodiment is that the conductive leads 14 of this embodiment are arranged in a straight line instead of being arranged side by side. In addition, since the conductive lead 14 of the previous embodiment is a metal wire (having a cross section to be circular or oval), made of copper, iron, aluminum, etc., thus the conductive lead 14 of this embodiment can also adopt the structure of the previous embodiment. Namely, in this embodiment, the conductive lead 14 is flat shaped, and includes a bendable portion 141, a welding portion 142 and a wiring portion 143 (the cross-section can be rectangular).

Of course, this embodiment is only for illustration and not limiting the scope of this disclosure, and equivalent modifications or changes made according to the miniaturized capacitor having built-in conductive leads of the aforesaid embodiment should be still included within the patent scope of this disclosure.

In summary, according to the embodiments of this disclosure, the capacitor includes the substrate, the main capacitor body, the plurality of conductive members and the plurality of conductive leads. The main capacitor body, disposed on the substrate, includes the capacitor unit and the packaging structure wrapping the capacitor unit. Each of the plurality of conductive members penetrates through the substrate, each of the plurality of conductive leads penetrates through the packaging structure, and the capacitor unit is connected with the plurality of conductive members via the plurality of conductive leads. Thereupon, in the capacitor of this disclosure, the substrate is effectively integrated with the plurality of built-in conductive leads, such that no more round rubber plug and plastic plate are required, and the height of the capacitor can be significantly reduced. Namely, the size of the capacitor can be greatly reduced to meet the needs of miniaturization.

In addition, according to the embodiments of this disclosure, since the capacitor is furnished with a plurality of built-in conductive leads, and each of the conductive leads is L shaped, thus the capacitor unit can connect the plurality of conductive members through correspondingly the plurality of conductive leads. Thereupon, the space occupied by the plurality of conductive leads of the capacitor can be reduced to the minimum, and the size of the capacitor can be further reduced to meet the needs of miniaturization. Thus, the application of the capacitor can be more extensive, and the use thereof can be more flexible.

In addition, according to the embodiments of this disclosure, since the capacitor is furnished with the built-in conductive leads and the plurality of conductive members at the substrate, thus the plurality of conductive leads of the capacitor will not be exposed to the surface of the capacitor. Through the above structure, the capacitor can be directly electrically connected to other components through the plurality of conductive members, so the plurality of conductive leads of the capacitor do not need to be crushed and bent any longer. The above structure can avoid destroying the capacitor structure, and can provide the capacitor a higher structural stability, so that the reliability of the capacitor can be effectively improved.

Furthermore, according to the embodiment of this disclosure, the design of the capacitor is simple, so the desired effect can be achieved without greatly increasing the cost. Thus, the capacitor of this disclosure can achieve higher practicability and better meet the needs of practical applications.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A miniaturized capacitor having built-in conductive leads, comprising:

a substrate;

a main capacitor body, disposed on the substrate, including a capacitor unit and a packaging structure wrapping the capacitor unit, a side surface of the packaging structure being in contact with the substrate;

a plurality of conductive members, penetrating individually through the substrate; and a plurality of conductive leads, penetrating individually through the packaging structure, but not protruding from the side surface of the packaging structure, whereby the plurality of conductive leads are disposed between the capacitor unit, the packaging structure and the substrate, and the capacitor unit is connected with the plurality of conductive members via the plurality of conductive leads, the plurality of conductive leads being respectively bonded to the plurality of conductive members via a conductive glue;

wherein each of the plurality of conductive leads includes a bendable portion, a welding portion and a wiring portion, the bendable portion is connected with the wiring portion via the welding portion, and the wiring portion and the corresponding conductive member are electrically connected;

wherein the welding portion includes a connection area and a welding area connected with the connection area, and the wiring portion is welded onto the welding area.

2. The miniaturized capacitor having built-in conductive leads of claim 1, wherein each of the plurality of conductive members includes a first conductive pad, at least one through hole and a second conductive pad, the first conductive pad is disposed on an upper surface of the substrate, the second conductive pad is disposed on a lower surface of the substrate, and the first conductive pad is connected with the second conductive pad via the at least one through hole.

3. The miniaturized capacitor having built-in conductive leads of claim 1, wherein the plurality of conductive leads are wrapped by the capacitor unit, the packaging structure and the substrate.

4. The miniaturized capacitor having built-in conductive leads of claim 1, wherein each of the plurality of conductive leads is L shaped.

5. The miniaturized capacitor having built-in conductive leads of claim 1, wherein the bendable portion, the welding portion and the wiring portion are all flat shaped.

6. The miniaturized capacitor having built-in conductive leads of claim 5, wherein a thickness of the welding portion or the wiring portion is greater than that of the bendable portion.

7. The miniaturized capacitor having built-in conductive leads of claim 1, wherein the packaging structure is made of an insulation material.

8. The miniaturized capacitor having built-in conductive leads of claim 1, wherein the substrate is one of a printed circuit board and a flexible circuit board.

9. The miniaturized capacitor having built-in conductive leads of claim 1, wherein each of the plurality of conductive leads is in L-shape, a projection of each of the plurality of conductive leads onto the substrate is completely located within a projection of the capacitor unit onto the substrate, and an outer edge of the projection of each of the plurality of conductive leads onto the substrate does not overlap with an outer edge of the projection of the capacitor unit onto the substrate.

* * * * *